April 3, 1928.
P. HELTON
1,664,924
COTTON HARVESTER
Filed April 27, 1926
3 Sheets-Sheet 1
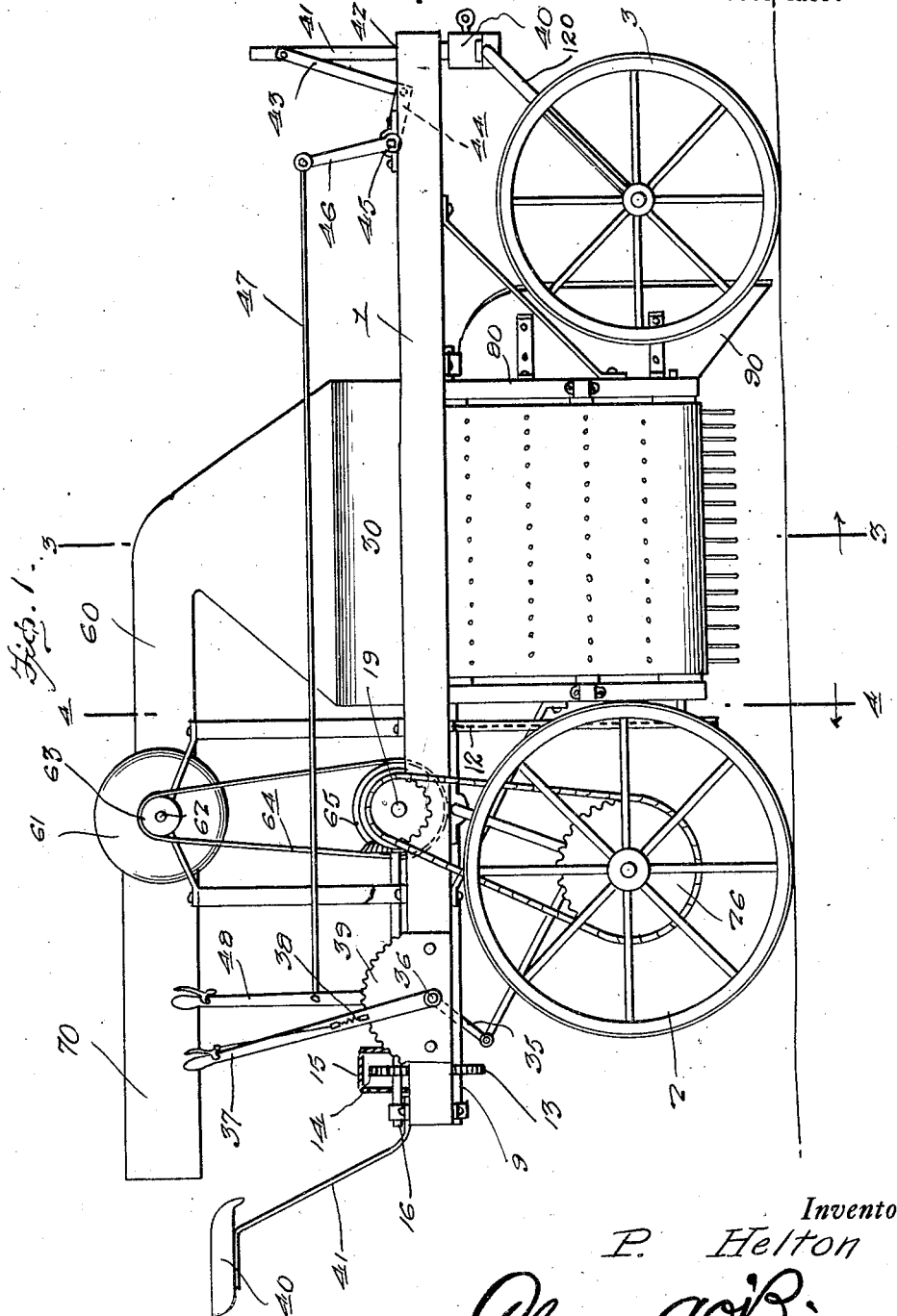
Inventor
P. Helton
By Clarence A. O'Brien
Attorney

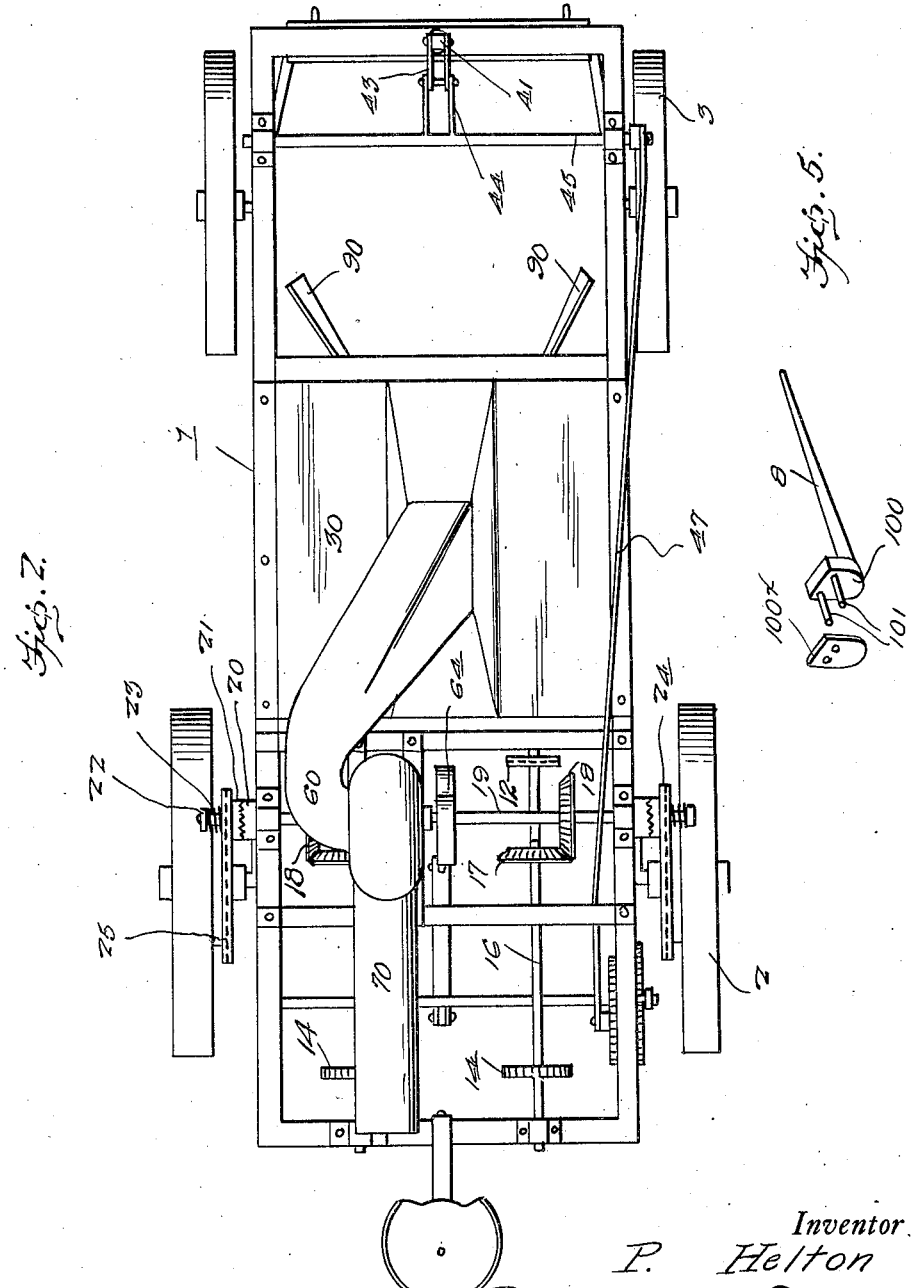

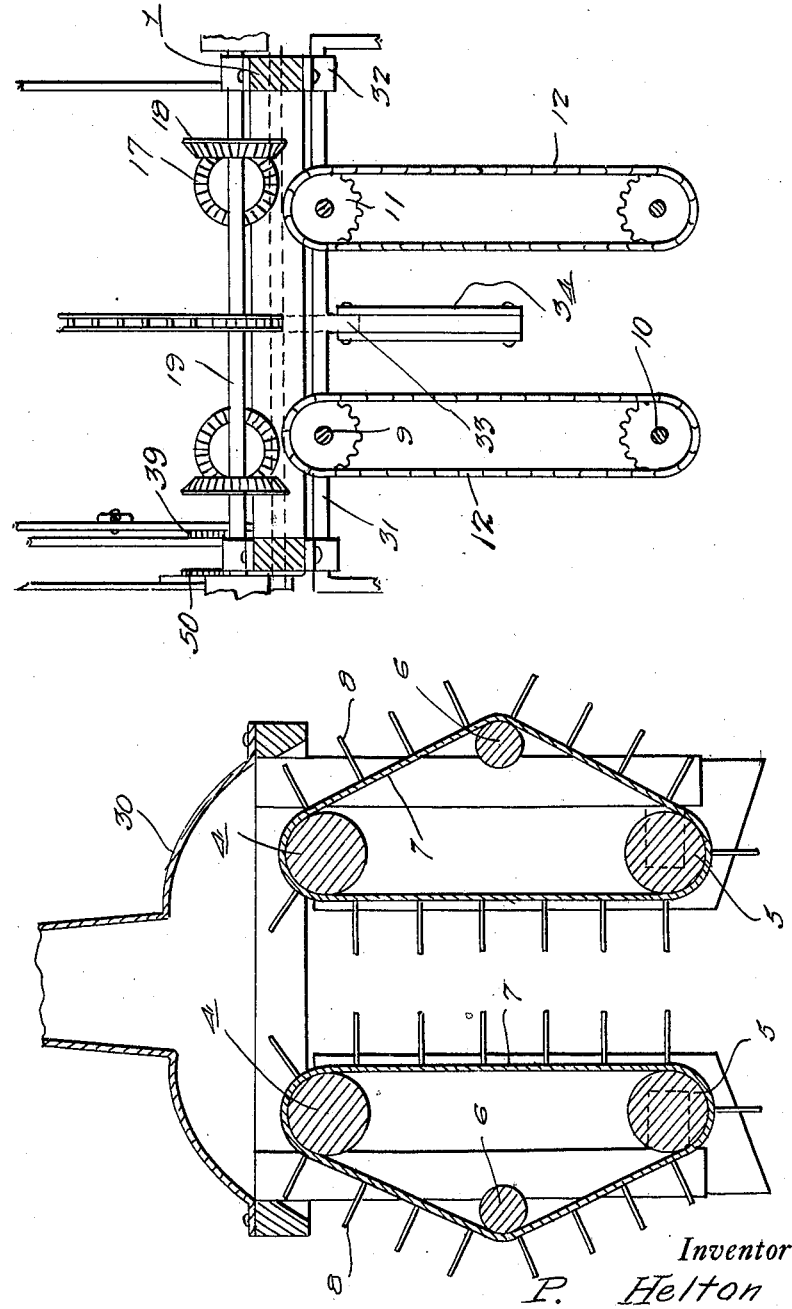

Patented Apr. 3, 1928.

1,664,924

UNITED STATES PATENT OFFICE.

PEYTON HELTON, OF ABBOTT, TEXAS.

COTTON HARVESTER.

Application filed April 27, 1926. Serial No. 104,986.

My present invention has to do with the harvesting of cotton, and it contemplates the provision of a simple and inexpensive apparatus adapted to operate upon both sides of a row of cotton plants and to efficiently pick cotton bolls from the plants and gather the cotton thus picked and discharge the cotton into means placed for the reception thereof.

The apparatus is designed to be moved along rows of cotton in succession, and with the foregoing in mind, the invention in all of its details will be fully understood from the following description and claim, when the same are read in connection with the drawings, accompanying and forming part of this specification, in which:

Figure 1 is a side elevation of the cotton harvester constituting the best practical embodiment of my invention of which I am cognizant.

Figure 2 is a top plan view of the apparatus.

Figures 3 and 4 are fragmentary transverse vertical sections, taken in the planes indicated by the lines 3—3 and 4—4, respectively, of Figure 1.

Figure 5 is a perspective of one of the teeth hereinafter explicitly referred to.

Similar numerals of reference designate corresponding parts in all of the views of the drawings.

Among other elements my novel harvester comprises a main frame 1 which may be of the construction illustrated or of any other construction compatible with the purpose of my invention. The said frame 1 is equipped with ground wheels 2 and 3, connected with the main frame 1 in the manner hereinafter explicitly described for the purpose which will become apparent.

Carried by the main frame 1 and arranged at opposite sides of the longitudinal center of the apparatus, are upper longitudinal rollers 4 and lower longitudinal rollers 5, the said rollers in conjunction with longitudinal rollers 6 arranged outwardly beyond the longitudinal vertical planes of the rollers 4 and 5 serving for the support of belts 7 on which are laterally directed spikes or teeth 8. The rollers 4 and 5 are fixed to longitudinal shafts 9 and 10, respectively, and the said shafts 9 and 10 are provided with sprocket gears 11 connected through the medium of sprocket belts 12 from which it will be understood that when motion is transmitted to the shafts 9 of the upper rollers 4, the lower rollers 5 will be driven positively in concert with the rollers 4. The shafts 9 are equipped at 13 with spur gears, Figures 1 and 2, and the said spur gears 13 are meshed with spur gears 14 disposed in housings 15 and carried by upper longitudinal shafts 16, which shafts 16 have miter gears 17 at their forward ends in mesh with miter gears 18 on a transverse shaft 19. The said transverse shaft 19 is provided at its ends with clutch members 20 opposed to complementary clutch members 21 on short shafts 22 which are pressed inwardly by springs 23 and are equipped with sprocket gears 24, connected through the medium of belts 25 with sprocket gears 26, fixed with respect to the rear ground wheels 2. Thus it will be understood that when the apparatus is moved forwardly, the belts 7 will be caused to travel in the directions indicated by arrows in Figure 3 so that incident to the upward traverses of the inner stretches of the belts 7, the teeth or spikes 8 will operate at opposite sides of a row of cotton plants and will pick the cotton bolls and carry the same upwardly to a point under a hood 30 at which time the cotton will be taken from the teeth or spikes 8 by suction as hereinafter set forth.

By virtue of the clutch provision alluded to, it will be apparent that a short turn in either direction may be made with the apparatus, the clutches enabling the inner wheel 2 to turn at a lower rate of speed than the outer wheel or the wheel that describes a circle incident to the making of the turn.

The rear ground wheels 2 are carried by a bail-shaped axle 31, the said axle 31 being journaled in bearings 32 on the main frame 1, and being equipped with a crank 33 which is connected through the medium of links 34 with a crank 35 on a transverse rock shaft 36 to which shaft 36 is fixed a hand lever 37 equipped with a detent 38 for cooperation with a segmental rack 39, fixed on the main frame 1. Manifestly through the medium of the means just described, the rear portion of the main frame 1 may be raised or lowered and may be adjustably fixed at various distances above the ground according to the height at which it is desired for the belts 7 to operate. It will also be noticed in said connection that the lever 37 is arranged in convenient proximity to a driver's seat 40ˣ, supported at 41 on the rear portion of the main frame 1.

At 40 is a transverse head disposed below the forward portion of the main frame 1. The said transverse head 40 is provided with a central vertical stem 41 which is guided at 42 in a vertical aperture in the forward bar of the main frame 1 and is connected through link means 43 with a crank 44 on a trasverse rock shaft 45, carried by the main frame 1, the said shaft 45 being provided with an additional arm 46 which is connected through a longitudinal rod 47 with a hand lever 48 which like the hand lever 37 is arranged in convenient proximity to the driver's seat 40ˣ. Said lever 48 is provided with a conventional or any other appropriate detent, not shown, for cooperation with a segmental rack 50, Figure 4. through the medium of which the lever 48 may be adjustably fixed to adjustably fix the forward portion of the main frame 1 at the desired distance above the ground.

The bail-shaped axle 120 of the front wheels 3 is fixedly connected to the said transverse head 40.

The hood 30 is preferably shaped as illustrated, and is merged into a conduit 60 which, in turn, is merged into a fan casing 61 in which is disposed a rotary suction fan the shaft 62 of which is equipped with a pulley 63, and is designed to be driven through the medium of a belt 64 by a pulley 65 fixed to the before mentioned transverse shaft 19.

It will be apparent from the foregoing that when the machine is traversing a row of cotton plants, the fan in the casing 61 will be driven at a high rate of speed with the result that a partial vacuum will be created in the hood 30 to bring about a suction action, and because of such suction action the cotton on the spikes or teeth 8 will be drawn into the hood 30 and the conduit 60, in the order named, and will be taken in and discharged from the fan casing 61, the discharge being through a conduit 70 also in communication with the casing 61 and designed to lead to a receptacle placed to receive the harvested cotton, the said receptacle being, when deemed expedient, carried by a vehicle, not shown, which may be moved alongside the harvester.

Fixedly connected to pendent portions 80 on the main frame 1 at opposite sides of the longitudinal vertical plane of the space between the inner stretches of the belts 7 are fenders 90, the said fenders 90 being flared laterally outward, Figure 2, and being, therefore, adapted to assure the inner stretches of the belts 7 moving at opposite sides of a row and this in such positions that there is practically no liability of the cotton plants in the row being injured incident to a traverse of the apparatus along the row.

I prefer in practice that my novel apparatus be moved by draft animals, but obviously within the purview of my invention any approved means may be employed for the movement of the apparatus along rows of cotton plants.

In the practical use of the apparatus, it will be apparent that cotton will be efficiently taken simultaneously from opposite sides of the plants in a row as the apparatus traverses the row, and this without injury to the plants, and it will also be appreciated in this connection that the operation of the apparatus to advantage will be attended by but little expense.

One of the spikes or teeth 8 before described is shown in perspective in Figure 5, and by reference to said figure it will be understood that in the preferred embodiment of my invention each of the spikes 8 is provided at its heel end with an enlargement 100 disposed at right angles to the major portion of the spikes, and that the said enlargement 100 is provided with prongs 101. The enlargement 100 is adapted to be opposed to the outer side and an apertured plate 100ˣ to the inner side of thin respective belt 7 which is preferably, though not necessarily, formed of leather, and the prongs 101 are forced through the leather of the belt and the apertures of plate 100ˣ and are clinched by upsetting or other approved means at the inner side of the plate 100ˣ. Manifestly in said manner the plurality of spikes or teeth 8 are strongly connected of themselves to the belts 7, and each spike or tooth 8 is connected independently of each and every other spike or tooth 8 so that when a spike or tooth is impaired or broken, it may be expeditiously and easily removed and as readily replaced with a fresh spike or tooth without disturbing the other spikes or teeth 8.

Notwithstanding the capacity of function of my novel harvester as pointed out in the foregoing, it will be understood that the harvester is inexpensive in construction and light in weight and of draft, and that all of its several parts are well adapted to withstand the usage to which harvester parts are ordinarily subjected.

While I prefer the construction herein illustrated and described, I do not desire to be understood as limiting myself to the precise construction and relative arrangement of parts as disclosed, my invention being defined by my appended claim within the scope of which modifications may be made without departure from my invention.

Having described my invention, what I claim and desire to secure by Letters Patent, is:—

A cotton harvester comprising a frame, a rear swingable bail shaped axle having the intermediate portion of its bail journaled in bearings at the under side of the frame, rear wheels on said axle, manually operable means for adjusting and adjustably fixing said axle to determine the height of the rear portion of the frame, a cross-head movable vertically below the forward portion of the frame and having a vertical stem guided in the frame, a bail shaped forward axle fixed to said cross-head and equipped with ground wheels, manually operable means connected to said stem for adjusting and adjustably fixing said stem with respect to the frame, lower and upper longitudinally disposed rollers carried by the frame and arranged in pairs at opposite sides of a longitudinal space adapted to accommodate plants in a row, belts trained over said rollers and having inner stretches movable upwardly and spaced apart, and means on said belts for picking cotton bolls incident to the traverse of the apparatus, fenders fixed to pendent portions of the frame and flared outwardly immediately in front of the space between the inner stretches of the belts, means on the frame for collecting cotton from said picking means, longitudinal shaft fixed to and extending rearwardly from the uppermost longitudinal rollers and having spur gears on their rear portions, upper longitudinal shafts having their spur gears meshed with the spur gears on the first named longitudinal shaft and also having miter gears, and a transverse shaft driven from the rear wheels and having miter gears meshed with the miter gears on the second named longitudinal shafts.

In testimony whereof I affix my signature.

PEYTON HELTON.